United States Patent [19]

McDonald

[11] 4,169,392
[45] Oct. 2, 1979

[54] SELF-ENERGIZING FRICTION DRIVE TRANSMISSION

[75] Inventor: Raymond F. McDonald, Winneconne, Wis.

[73] Assignee: J. I. Case Company, Racine, Wis.

[21] Appl. No.: 797,707

[22] Filed: May 17, 1977

[51] Int. Cl.² ..................... F16H 15/10; A01D 69/8
[52] U.S. Cl. .................................... 74/197; 74/194; 56/DIG. 4
[58] Field of Search ............. 74/194, 196, 197, 242.8, 74/242.9, 242.11 C, 242.12; 180/70 R; 56/11.3, DIG. 4

[56] References Cited

U.S. PATENT DOCUMENTS

| | | | |
|---|---|---|---|
| 1,592,952 | 7/1926 | Martin | 74/194 |
| 2,942,487 | 6/1960 | Claus | 74/197 |
| 3,059,397 | 10/1962 | Anderson et al. | 56/DIG. 4 |
| 3,398,807 | 8/1968 | Berger | 74/197 |
| 3,473,622 | 10/1969 | Orr | 74/197 |
| 3,667,304 | 6/1972 | Puffer et al. | 74/196 |

Primary Examiner—Samuel Scott
Assistant Examiner—William R. Henderson
Attorney, Agent, or Firm—Cullen, Sloman, Cantor, Grauer, Scott & Rutherford

[57] ABSTRACT

The disclosed friction disc transmission includes a conventional drive disc rotatable about a vertical axis and a vertical friction disc engaging the top horizontal face of the drive disc to be driven about a horizontal axis. The friction disc is rotatably supported on a pivot frame having a sprocket drive connected to a sprocket on the wheel axle. The wheel axle sprocket in the self-energizing transmission is located vertically below the drive sprocket and the drive sprocket is located between the frame pivot axis and the friction disc. The tension in the drive chain thereby compresses the friction disc into engagement with the drive disc in proportion to the torsion in the wheel axle and eliminates the requirement of a spring. Other improvements include the novel chain drive including a driven sprocket on the pivot frame.

2 Claims, 5 Drawing Figures

SELF-ENERGIZING FRICTION DRIVE TRANSMISSION

FIELD OF THE INVENTION

The present invention relates to variable speed friction disc transmissions having a pair of discs; the friction or driven disc having its periphery engaging the face of the drive disc. Friction disc transmissions of the type disclosed herein are used primarily for propulsion of small land traversing vehicles, particularly power lawn mowers.

A variable speed friction disc transmission of the type disclosed herein is shown in U.S. Pat. No. 2,942,487 of Claus. The transmission disclosed in the Claus Patent includes a driving disc rotatable about a vertical axis having a flat horizontal face normal to its axis of rotation and a driven disc rotatable on an axis normal to the axis of the driving disc and having its periphery engaging the face of the driving disc. As is known, the speed at which rotation is imparted to the driven disc is a function of the distance between the axis of the driving disc and the zone at which its face is engaged by the periphery of the driven disc. Further, the driven disc rotates in one direction on one side of the rotational axis of the driving disc and in the opposite direction on the opposed side. Thus, the driven disc may be rotated at any desired speed in either direction simply by moving the driven disc across the face of the driving disc.

The friction disc transmission disclosed in the Claus Patent has however several disadvantages. First, the driven disc is yieldably maintained in contact with the driving disc by a tension spring. Thus, the force urging the driven disc into contact with the driving disc is the smallest when the discs are in contact and increases as the discs are separated. This is not a desirable relationship, particularly as the spring ages and loses tension. The friction disc transmission disclosed in the Claus Patent utilizes a conventional gear speed reducer which is subject to failure and relatively expensive. The prior art has not however made any significant improvement over the variable speed friction disc transmission disclosed in the Claus Patent or solved the problems described above.

The need therefore exists for a simple variable speed friction disc transmission which is self-energizing wherein the frictional pressure between the discs is proportional to the load, thereby limiting frictional wear and providing optimum drive. Further, the prior art has not suggested an improved variable speed drive for a friction disc transmission. These and other improvements have been made in the variable speed friction disc transmission of the present invention.

SUMMARY OF THE INVENTION

The self-energizing friction disc transmission of the present invention includes a drive disc rotatably mounted on a generally vertical axis and a driven friction disc rotatable about a horizontal axis normal to the axis of the drive disc and having a periphery engaging the face of the drive disc as disclosed in the above referenced patent of Claus. The friction disc in the preferred embodiment is supported on a pivot frame which is pivotally supported on a horizontal pivot axis spaced from the horizontal rotational axis of the friction disc. A drive sprocket is rotatably supported on the pivot frame between the frame pivot and the rotational axis of the friction disc. The drive sprocket is driven by the friction disc and drives an axle sprocket mounted on a horizontal wheel axle for driving the wheel of a ground traversing vehicle. In the disclosed embodiment, a chain is entrained on the drive and wheel axle sprockets providing a positive drive. In the preferred embodiment, the wheel axle is vertically spaced below the drive sprocket on the pivot frame tensioning the distal end of the pivot frame downwardly and the friction disc against the drive disc providing the self-energizing feature of the present invention. In either direction, forward or reverse, the contact pressure between the friction and drive discs is proportional to the torsional load on the wheel axle.

In the preferred embodiment, the drive also includes a speed reduction power take off. As described, the friction disc is rotatably mounted on the pivot frame adjacent the distal end. The friction disc shaft includes a hub-sprocket which is driven by the friction disc. The driven hub-sprocket of the friction disc drives a larger sprocket on a second rotatable shaft on the pivot frame. A chain is entrained around the sprockets to provide a positive drive. A second hub-sprocket on the second shaft drives the wheel axle as described above.

The variable speed friction disc transmission of the present invention thus eliminates many of the problems inherent in the transmissions disclosed in the prior art. The friction disc transmission of the present invention is self-energizing resulting in an optimum contact pressure between the drive and driven discs, limiting wear of the discs and providing maximum power out put. The friction disc transmission of the present invention also includes a unique drive which eliminates the requirement of a gear speed reducer and results in a relatively simple positive drive. Other advantages and meritorious features of the present invention will be more fully understood from the following description of the preferred embodiments, the appended claims and the drawings, a brief description of which follows.

BRIEF DESCRIPTION OF THE DRAWINGS

FIG. 5 is a schematic view of the chain drive utilized in the friction disc transmission shown in FIGS. 1 and 2 illustrating the self-energizing feature of the transmission.

DESCRIPTION OF THE PREFERRED EMBODIMENTS

As described above, the friction disc transmission of the present invention was specifically designed for small tractor-like vehicles such as power lawn mowers. It will be understood by those skilled in the art however that the self-energizing transmission of the present invention may be utilized in other applications, particularly the improvements disclosed and claimed herein. The transmission of the present invention will be described in regard to a four-wheeled lawn mowor tractor or the like.

Figure 1:
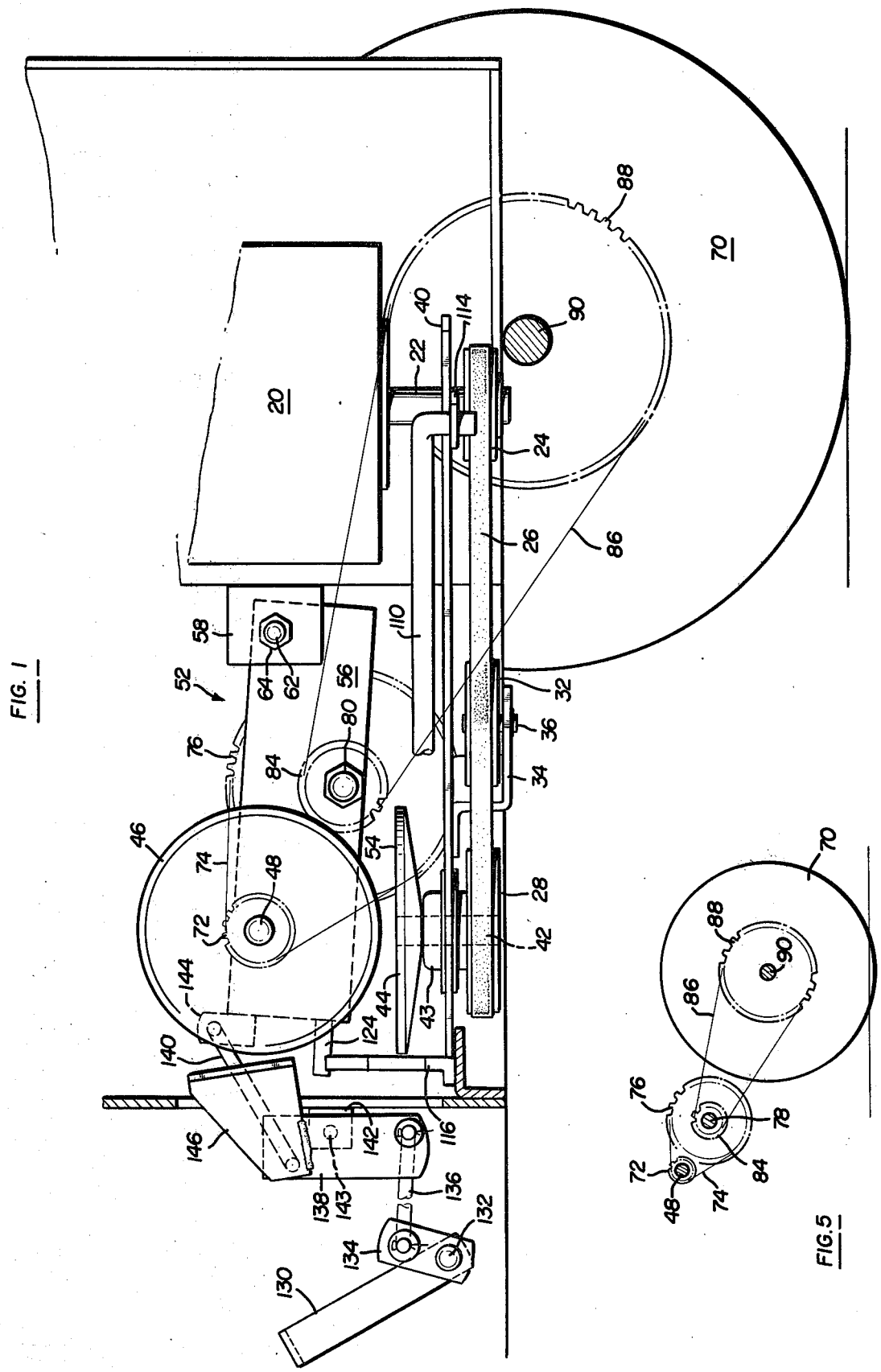
FIG. 1 is a side view of one embodiment of the self-energizing friction disc transmission of this invention.
Figure 2:
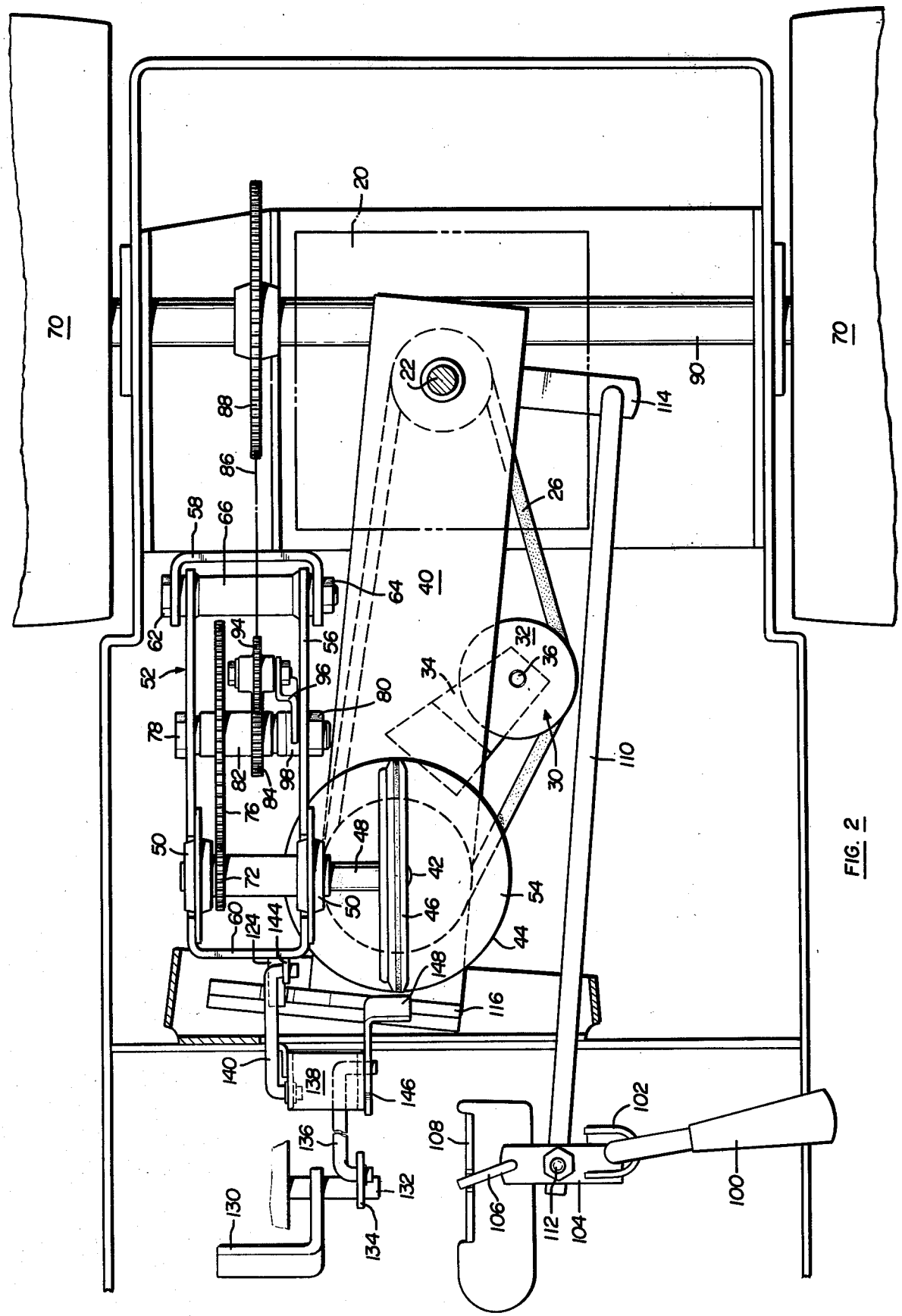
FIG. 2 is a top elevation of the embodiment of the self-energizing friction disc transmission shown in FIG. 1.

The power source 20 of the friction disc transmission may be a conventional four cycle gasoline motor or the like. The motor is supported with the drive shaft 22 extending vertically downwardly as shown in FIG. 1 and a pulley or hub 24 is secured to the shaft for rotation therewith. A conventional V-belt 26 is received on the hub 24 and the drive pulley 28 of the friction disc transmission. A conventional idler assembly 30 may be provided to maintain tension in the V-belt, particularly during idling of the transmission. The idler assembly includes a V-belt pulley 32, a spring-biased bracket 34 which rotatably supports the pulley 32 on shaft 36 and a conventional coil-spring, not shown. The bracket 34 is pivotally supported on plate or swing-arm 40 and a coil-spring urges the pulley 32 against the V-belt 26 as shown in FIG. 2.

The pulley 28 is rotatably supported on a vertical shaft 42 on bearing assembly 43. The drive or driving disc 44 in the disclosed embodiment of the friction disc transmission is rotatably supported on vertical shaft 42. Thus, motor 20 rotatably drives the drive disc 44 through pulleys 24 and 28 and V-belt 26.

The driven assembly includes the friction or driven disc 46 which is rotatably supported on a horizontal axis comprising shaft 48 and bearings 50. Shaft 48 is supported for rotation on pivot frame or bracket 52. As described above, the rim of the friction disc is received against the flat horizontal face 54 of drive disc 44, rotating the friction disc 46 in one direction on one side of the vertical axis 42 and in the opposite direction on the opposed side. Further, the speed of imparted rotation is dependent upon the distance from the axis 42. The speed being greatest at the periphery of the drive disc and zero or "neutral" at the axis. This form of friction transmission is described in more detail in the above referenced patent of Claus.

The pivot frame 52 includes side plates 56, support end bracket 58, which is welded or otherwise secured to a vertical plate of the tractor housing and an opposed end plate 60. The side plates 56 of the pivot frame are pivotally supported on bracket 58 in a conventional manner such as shown in FIG. 2. In the disclosed embodiment, a bolt 62 is received through the ends of the U-shaped bracket 58 and the side plate 56 and a nut 64 retains the bolt in place. A support and bearing element 66 is received between the side plates and washers may be provided between the side plates and the ends of the bracket 58. The distal end 60 of the bracket is thus free to pivot about the horizontal axis of bolt 62.

Power is transmitted to the rear wheels 70 of the tractor as follows. A hub-sprocket 72 is operably supported on friction disc shaft 48 for rotation with the friction disc. A first drive chain 74 is entrained on hub-sprocket 72 and sprocket 76, driving the larger sprocket. Sprocket 76 is rotatably supported on a second parallel horizontal axis provided by bolt 78 which is received through the side walls 56 of the pivot frame and secured by nut 80. In the disclosed embodiment, the sprocket 76 is secured to a bearing element 82 which rotates a second smaller hub-sprocket 84. A second drive chain 86 is then entrained on hub-sprocket 84 and the wheel axle sprocket 88 secured to the vehicle axle 90. The power of motor 20 is thus transmitted through the friction discs 44 and 46, through drive chains 74 and 86 to the rear axle 90 of the tractor to drive the wheels 70 forward or in reverse dependent upon the position of the friction disc 46 relative to the drive disc 44 as described above. As will be understood by those skilled in the art, the differential in size between hub-sprocket 72 and sprocket 76 and hub-sprocket 84 and sprocket 88 results in a substantial mechanical advantage.

In the disclosed embodiment, a spring-biased idler is provided in the second chain 86 to maintain tension in the chain during idle. As described below, tension is normally maintained in the chain during forward and reverse. The disclosed embodiment of the idler includes an idler-sprocket 94 which is rotatably mounted on an outwardly biased bracket 96. In the disclosed embodiment, the bracket is supported on a separate bearing element 98 on bolt 78.

As described above, the friction or driven disc in the friction disc transmissions disclosed in the prior art are spring biased against the drive or driving disc. The spring force is thus at a minimum when the discs are in contact and the spring force increases as the discs are separated. The preferred embodiment of the friction disc transmission of the present invention is self-energizing, wherein the force urging the friction disc into contact with the drive disc is proportional to the torsional load on the axle, providing maximum pressure during peak loads as when the tractor is moving up hill and minimal contact when the load is light, such as when the tractor is moving down hill. The self-energizing feature of the present invention is best illustrated in FIG. 5. As described above, the horizontal rotational axis 78 of hub-sprocket 84 is supported on pivot frame 52 between pivot axis 62 and axis 48 of friction disc 46. The rotational axis 90 of chain sprocket 88 is located vertically below the axis 78 of sprocket 84. The tension in chain 86 is thus transmitted to shaft 78, urging the friction disc 46 into frictional contact with drive disc 44. Further, the greater the tension the greater the downward force. Thus, when the tractor is under greatest load, as when the tractor is moving up hill, the force urging the friction disc into contact with the drive disc is greatest. As shown in FIG. 5, the upper run of the chain 86 is under tension when the vehicle is moving forwardly and the lower run of the chain is under tension when the vehicle is moving rearwardly. In either event, the axis 78 is urged downwardly, forcing the friction disc into contact with the drive disc.

The control of the disclosed embodiment of the friction disc transmission may be utilized to vary the speed of rotation of the friction disc and thus the wheels, set the friction disc in neutral or idle and brake rotation of the friction disc. The disclosed embodiment includes two sets of controls. The first to be described is the speed control.

As shown in FIG. 2, the speed control is operated by an operator lever or handle 100 which may be positioned adjacent the steering column of the tractor, not shown. The shaft of the control handle is supported in a support bracket 102 which permits forward and rearward motion of the handle. The handle is connected to one end of link 104 and an L-shaped latch pin 106 is disposed through the opposed end. The latch pin is received on the upper edge of the L-shaped control bracket 108 as described herein below. The center of link 104 is secured to control rod 110 by a bolt 112 or other means of securement. The opposed end of the control rod 110 is pivotally secured to swing arm extension or bracket 114.

The control rod 110 may be pivotally supported at its base, not shown, such that forward motion of the handle rotates extension 114 and swing plate 40 in a clockwise direction about the axis of drive shaft 22. In effect, the friction disc 46 is thus moved toward the periphery of the drive disc, toward the bottom of FIG. 2. The forward speed of the tractor is thus increased as the control lever or handle 100 is moved forwardly. Conversely, the speed of the tractor is reduced as the friction disc approaches the center or neutral axis of the drive disc. When the handle is moved sufficiently rearwardly for the friction disc to contact the opposed side of the drive disc, the upper portion in FIG. 2, the tractor mower is driven rearwardly at increasing speeds. The bracket 108 in the disclosed embodiment includes an upwardly extending portion which may include a series of notches for receipt of the latch pin 106, retaining the control rod 110 in the set position.

Figures 3, 4:
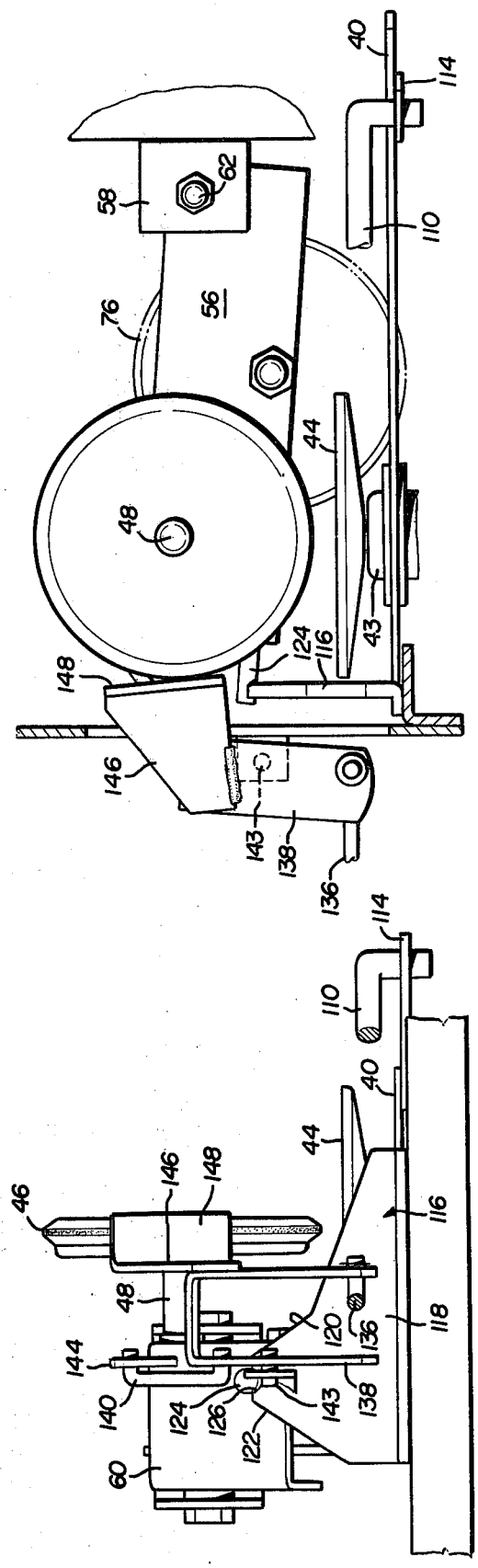
FIG. 3 is a partial side view of the friction disc transmission shown in FIG. 1 following actuation of the clutch-brake.
FIG. 4 is an end view of the self-actuating friction disc transmission shown in FIGS. 1 and 2.

The preferred speed control also includes a unique control plate 116 which lifts the friction disc over the center neutral axis, eliminating wear in the neutral or idle position. The control plate is generally L-shaped having an upwardly extending portion 118 having a configured face. In the disclosed embodiment, the upper face includes opposed vertically inclined faces 120 and 122 which receives the extension 124 of the pivot frame 52 to lift the pivot frame about pivot axis 62 and friction disc 46 out of contact with the drive disc 44. A notch 126 may be provided adjacent the mid-portion of the control plate to retain the friction disc in the neutral position as shown in FIGS. 1 and 3. A line drawn along the swing plate 40 through the vertical axis of drive shaft 22 and vertical axis of shaft 42 is generally perpendicular to the control plate 116.

As described above, one important source of wear of the friction disc results from the friction disc contacting the drive disc at the center or neutral axis. As will be understood, a lawn tractor or the like is often set at idle, resulting in flat portions being ground on the friction disc. This problem has been solved in the friction disc transmission of the present invention by providing the configured control plate 116 which simply raises the friction disc when the friction disc is over the center or neutral axis of the drive disc.

As described above, the control of the friction disc transmission of the present invention also includes a clutch-brake. The clutch-brake includes an L-shaped foot pedal 130 which is mounted on a rock shaft 132. The rock shaft 132 is mounted for rotational movement (not shown) to the power lawn mower body as is conventional. Follower link 134 is connected at one end to rock shaft 132 for rotation with foot pedal 130. A C-shaped link 136 is pivotally connected at one end to follower link 134 and a U-shaped bracket 138 at the opposed end. Conventional Cotter pins retain the C-shaped link as shown in FIG. 1. The U-shaped link is pivotally supported by a bracket 142 having a pivot axis or pin 143. The control bracket is thus rotated in a clockwise direction about pivot axis 143 when the foot pedal 130 is depressed.

As best shown in FIG. 2, a C-shaped link is pivotally connected at one end to the control bracket and the link extends upwardly to be connected at the opposed end to an extension 144 of the pivot frame 52. Clockwise rotation of the control bracket 138 thus lifts the distal end of the pivot frame 52 to lift the friction disc out of contact with the drive disc. The control bracket 138 also includes an L-shaped brake shoe 146 welded or otherwise secured to the side of the control link. Further depression of the pedal 130 brings the end 148 of the control link into contact with the periphery of the friction disc, braking the friction disc. In the preferred embodiment, the clutching and braking operations are performed sequentially. That is, link 140 first lifts the friction disc from the drive disc. Then, face 148 of the brake shoe contacts the periphery of the friction disc, braking rotational motion of the friction disc. It will be understood that the clutching function may also be performed separately, wherein the clutch-brake pedal is partially depressed, releasing the drive mechanism and putting the transmission in neutral.

The control mechanisms of the friction disc transmission have therefore different functions. Control handle 100 may be utilized to increase and decrease the speed of the lawn tractor, shift gears and place the tractor in neutral. The clutch-brake pedal 130 may be utilized to clutch the transmission at any speed without returning the drive disc to neutral or for braking the tractor.

As described above, the transmission is shown in neutral in FIGS. 1 to 3. The control plate 40 has been rotated by control handle 100 to lift the friction disc. As shown in FIG. 2, the friction disc is located over the center neutral axis of the drive disc 54. In FIG. 3, the clutch-brake pedal 130 has been fully depressed, bringing the brake shoe 146 into contact with the friction disc, stopping the disc.

It will be understood that various details of the friction disc transmission of the present invention have not been disclosed as such details are considered conventional. Further, conventional materials may be utilized for the elements of the transmission. For example, many of the elements may be formed from sheet or rod steel. The drive and friction discs may be formed from synthetic rubber or various plastic materials preferrably having a friction grit or filler material. It will also be understood that the various improvements utilized in the friction disc transmission of the present invention may be utilized separately. For example, the clutch-brake mechanism or the control plate may be utilized in the friction disc transmission disclosed in the Claus Patent. Alternatively, the unique self-energizing feature may be used with a conventional control. Having described the self-energizing friction disc transmission of the present invention, we make the following claims.

I claim:

1. A self-energizing friction disc transmission, comprising:
    a drive disc rotatably mounted on a generally vertical axis, said drive disc mounted on a laterally swingable support, said support singable about a vertical axis generally parallel to and spaced from said vertical drive disc axis,
    a driven friction disc supported on a frame means rotatable about a horizontal axis above said drive disc, said friction disc rotatably mounted on a first shaft supported on said frame means, said first shaft having a sprocket rotatable with said friction disc,
    said frame means supported on a horizontal pivot axis spaced from said horizontal rotational axis of said friction disc,
    a second shaft rotatably supported on said frame means between said first shaft and said pivot axis of said frame, said second shaft being rotatably mounted on said frame means below said first shaft and said pivot axis of said frame, a large and a small sprocket supported for rotation in unison on said second shaft,
    a wheel axle sprocket mounted on a horizontal wheel axle for driving the wheels of a ground traversing vehicle, a first chain entrained on said first shaft sprocket and said large second shaft sprocket rotatably driving said second shaft and a second chain entrained on said small sprocket of said second shaft and said wheel axle sprocket rotatably driving said axle, and said wheel axle sprocket vertically spaced below and to the rear of said first shaft, second shaft, and pivot axis of said frame, whereby the tension in said second chain compresses said friction disc against said drive disc in proportion to the torsional load on said axle.

2. The friction disc transmission defined in claim 1 including a control guide on said laterally swingable support having an upwardly facing vertically inclined camming face and a guide on the distal end of said frame means engaging said camming face upon lateral swinging movement of said support vertically lifting said frame means and said friction disc out of engagement with said drive disc.

* * * * *